US012000570B2

(12) United States Patent
Yueh

(10) Patent No.: US 12,000,570 B2
(45) Date of Patent: Jun. 4, 2024

(54) LIGHT BULB

(71) Applicant: DONGGUAN SAMPO ELECTRONICS CO., LTD., Dongguan (CN)

(72) Inventor: Pai-Chuan Yueh, Dongguan (CN)

(73) Assignee: DONGGUAN SAMPO ELECTRONICS CO., LTD., Dongguan (CN)

( * ) Notice: Subject to any disclaimer, the term of this patent is extended or adjusted under 35 U.S.C. 154(b) by 0 days.

(21) Appl. No.: 18/327,866

(22) Filed: Jun. 1, 2023

(65) Prior Publication Data

US 2024/0085001 A1 Mar. 14, 2024

(30) Foreign Application Priority Data

Sep. 13, 2022 (CN) .......................... 202211110760.9

(51) Int. Cl.

| | |
|---|---|
| ***F21V 19/00*** | (2006.01) |
| ***F21K 9/235*** | (2016.01) |
| ***F21K 9/238*** | (2016.01) |
| ***H05B 45/20*** | (2020.01) |
| *F21Y 105/10* | (2016.01) |
| *F21Y 115/10* | (2016.01) |

(52) U.S. Cl.

CPC .......... *F21V 19/0055* (2013.01); *F21K 9/235* (2016.08); *F21K 9/238* (2016.08); *H05B 45/20* (2020.01); *F21Y 2105/10* (2016.08); *F21Y 2115/10* (2016.08)

(58) Field of Classification Search

CPC ...... F21V 19/0055; F21K 9/238; F21K 9/235; H05B 45/20

See application file for complete search history.

(56) References Cited

U.S. PATENT DOCUMENTS

| | | | | |
|---|---|---|---|---|
| 10,228,095 | B2 * | 3/2019 | Liang | F21V 23/006 |
| 2015/0252955 | A1 * | 9/2015 | Boschetto | F21V 23/002 362/249.02 |
| 2017/0202061 | A1 * | 7/2017 | Allen | F21V 23/001 |
| 2020/0168660 | A1 * | 5/2020 | Lee | H01L 27/153 |
| 2023/0213154 | A1 * | 7/2023 | Lee | F21K 9/232 362/249.01 |

* cited by examiner

*Primary Examiner* — Christopher E Dunay

(74) *Attorney, Agent, or Firm* — Muncy, Geissler, Olds & Lowe, P.C.

(57) ABSTRACT

A light bulb includes: a bulb holder, a base, a lampshade, and an LED bulb panel. A lower end of the base is connected to the bulb holder. An upper end of the base is connected to the lampshade. The LED bulb panel is disposed on the base. A metal ring is sleeved on the lower end of the base. A first contact and a second contact are disposed on the bulb holder. A first light-emitting circuit and a second light-emitting circuit are disposed on the LED bulb panel. The metal ring is electrically connected to a first end of the first light-emitting circuit and a first end of the second light-emitting circuit. The first contact is electrically connected to a second end of the first light-emitting circuit. The second contact is electrically connected to a second end of the second light-emitting circuit.

11 Claims, 6 Drawing Sheets

LIGHT BULB

TECHNICAL FIELD

The present disclosure relates to a technical field of spiral lamp caps, and in particular to a light bulb.

BACKGROUND

At present, Light Emitting Diode (LED) bulbs are generally divided into two types, and a first type of the LED bulbs is light bulbs powered by Alternating Current (AC) mains. In the first type, two contacts of the LED bulbs powered by the AC mains are disposed on a bulb body, one of the two contacts is connected to an AC mains supply fire line, and the other one of the two contacts is connected to an AC mains supply zero line. The LED bulbs powered by the AC mains contains a driver, and overall temperature of the LED bulbs powered by the AC mains is increased due to heat dissipated by the driver. This type of the LED bulbs powered by the AC mains can be made into two-color dimmable light bulbs, but a production scheme is complex and production cost is high.

A second type of the LED bulbs is low-voltage bulbs. The low-voltage bulbs comprise two contacts, and one of the two contacts is connected to a positive terminal of a direct current (DC) power supply and the other one of the two contacts is connected to a negative terminal of the DC power supply. A power supply of the low-voltage bulbs does not contain the driver. Since the low-voltage bulbs have only the two contacts, only one path of lamp beads is installed in the low-voltage bulb, that is, the low-voltage bulbs only emits light of one color, which cannot meet requirements of being made into the two-color dimmable light bulbs

SUMMARY

In order to solve above problems, the present disclosure aims to provide a light bulb, which emits light of two different colors.

In order to achieve above purpose, technical scheme adopted by the present disclosure is as follow:

A light bulb include a bulb holder, a base, a lampshade, and an LED bulb panel. A lower end of the base is connected to the bulb holder. An upper end of the base is connected to the lampshade. The LED bulb panel is disposed on the base. A metal ring is sleeved on the lower end of the base. A first contact and a second contact are disposed on the bulb holder. A first light-emitting circuit and a second light-emitting circuit are disposed on the LED bulb panel. The metal ring is electrically connected to a first end of the first light-emitting circuit and a first end of the second light-emitting circuit. The first contact is electrically connected to a second end of the first light-emitting circuit. The second contact is electrically connected to a second end of the second light-emitting circuit.

Furthermore, the first light-emitting circuit includes a first LED circuit or a plurality of first LED circuits connected in parallel with each other.

Furthermore, the first LED circuit is formed by connecting a plurality of first LED lights in series.

Furthermore, the plurality of first LED lights are white light LED lights.

Furthermore, the first light-emitting circuit further includes a diode D1, and the diode D1 is connected to the first LED circuit.

Furthermore, the second light-emitting circuit includes a second LED circuit or a plurality of second LED circuits connected in parallel with each other.

Furthermore, the second LED circuit is formed by connecting a plurality of second LED lights in series.

Furthermore, the plurality of second LED lights are yellow light LED lights.

Furthermore, the second light-emitting circuit further includes a diode D2, and the diode D2 is connected to the second LED circuit.

Furthermore, the lampshade is a molding component made of PC material.

Furthermore, the bulb holder is selected from an E27 bulb holder, a G125 bulb holder, and a G95 bulb holder.

Furthermore, a plurality of pins are disposed on the metal ring, and a plurality of jacks corresponding to the plurality of pins are defined on the base.

Furthermore, the number of the plurality of pins is four, and the four pins are uniformly distributed on an inner side of the metal ring.

The metal ring is sleeved on the lower end of the base of the present disclosure. The first contact and the second contact are disposed on the bulb holder. The first light-emitting circuit and the second light-emitting circuit are disposed on the LED bulb panel. The metal ring is electrically connected to the first end of the first light-emitting circuit and the first end of the second light-emitting circuit. The first contact is electrically connected to the second end of the first light-emitting circuit. The second contact is electrically connected to the second end of the second light-emitting circuit. In the present disclosure, compared with a conventional light bulb, the metal ring 3 is added in the present disclosure. That is, a third contact is additionally disposed. Therefore, two light-emitting circuits are disposed in the light bulb, and each of the light-emitting circuits emits light of one color, so that the light bulb emits light of two different colors.

Figure 1:
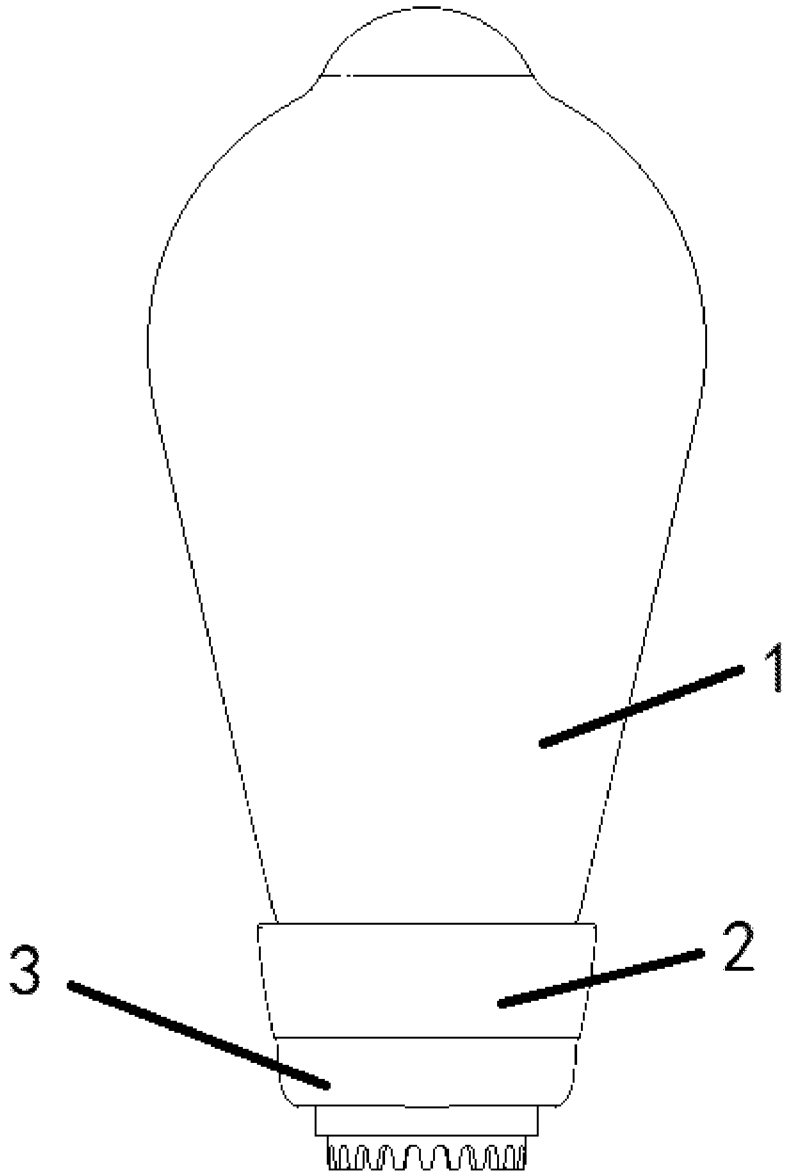
FIG. 1 is a structural schematic diagram of a light bulb according to one embodiment of the present disclosure.

Reference numbers in the drawings: 1. lampshade; 2. base; 3. metal ring; 4. jacks; 5. pins; 6. first contact; 7. second contact; 8. LED bulb panel; 9. LED bulb; 10. bulb holder; 11. bulb panel supporting components.

DETAILED DESCRIPTION

Figure 2:
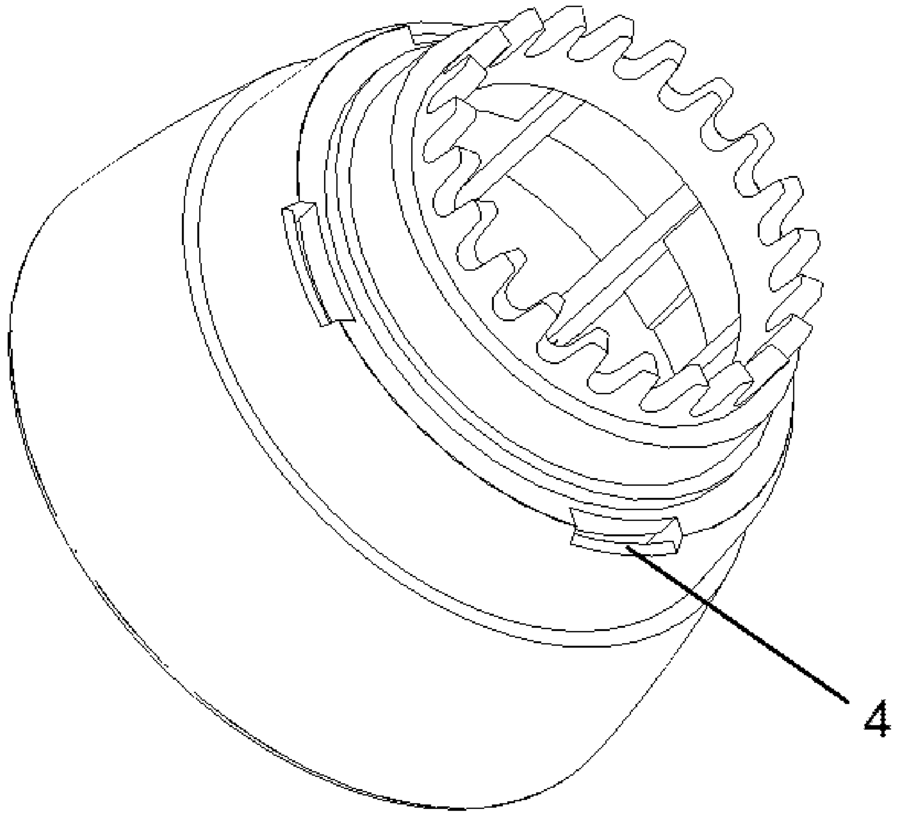
FIG. 2 is a structural schematic diagram of a base according to one embodiment of the present disclosure.
Figure 3:
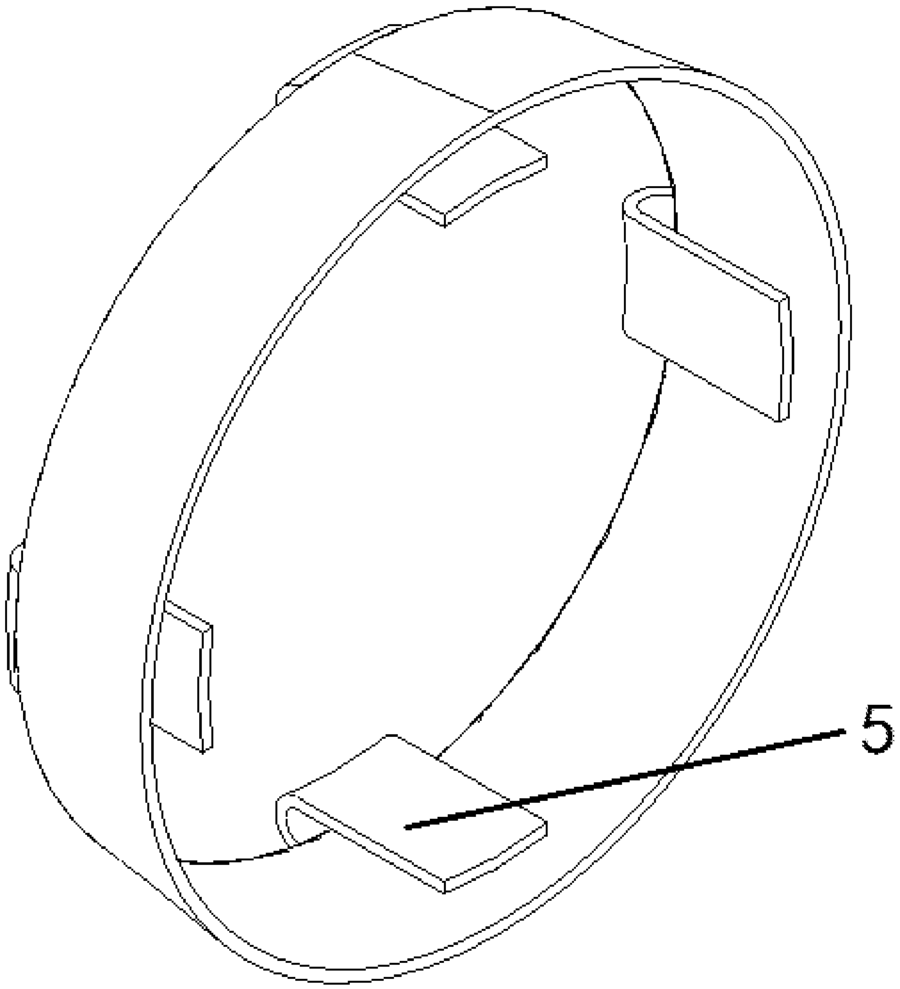
FIG. 3 is a structural schematic diagram of a metal ring according to one embodiment of the present disclosure.
Figure 4:
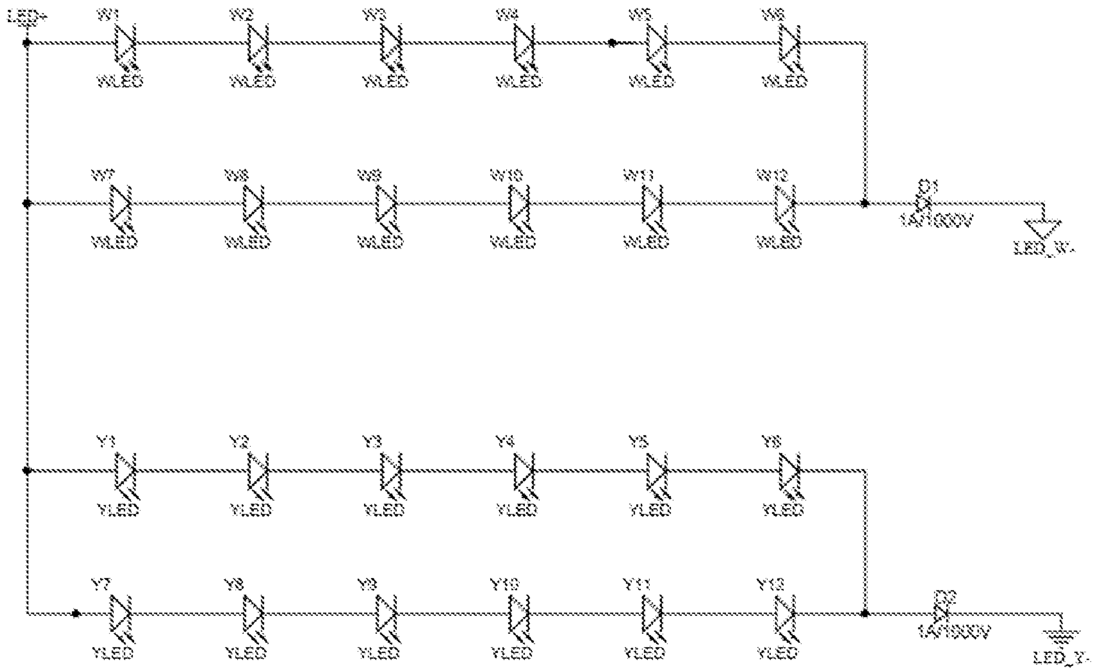
FIG. 4 is a circuit schematic diagram of an LED bulb panel according to one embodiment of the present disclosure.
Figure 5:
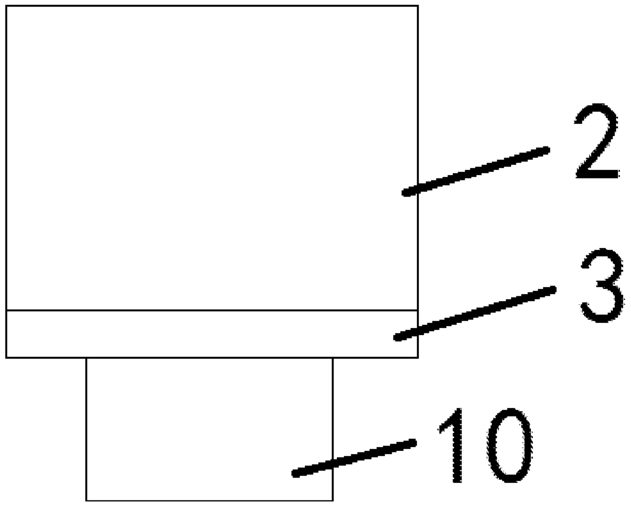
FIG. 5 is a schematic diagram of a connection between the base and a bulb holder according to one embodiment of the present disclosure.
Figure 6:
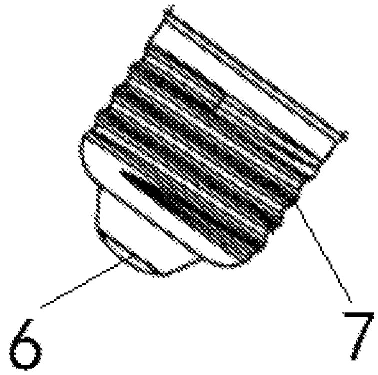
FIG. 6 is a structural schematic diagram of the bulb holder according to one embodiment of the present disclosure.
Figure 7:
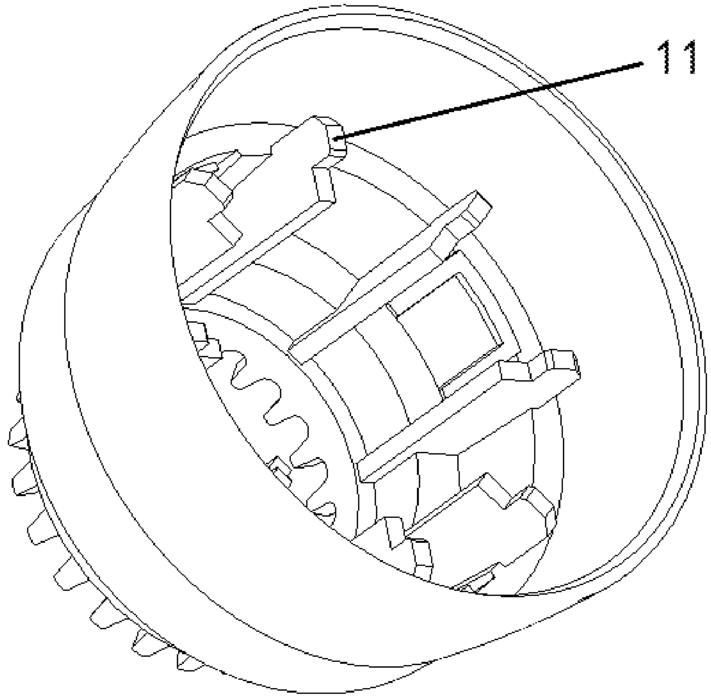
FIG. 7 is a structural schematic diagram of the base at another angle according to one embodiment of the present disclosure.
Figure 8:
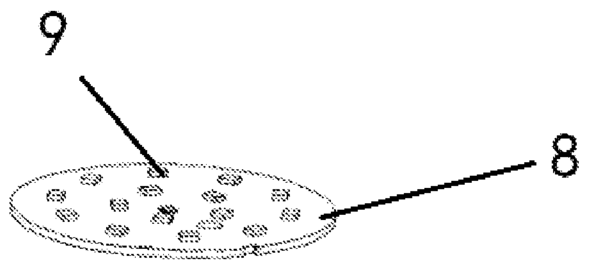
FIG. 8 is a structural schematic diagram of the LED bulb panel according to one embodiment of the present disclosure.

As shown in FIGS. 1-8, the present disclosure provides a light bulb. The light bulb includes a bulb holder 10, a base 2, a lampshade 1, and an LED bulb panel 8. A lower end of the base 2 is connected to the bulb holder 10. An upper end of the base 2 is connected to the lampshade 1. The LED bulb panel 8 is disposed on the base 2. A metal ring 3 is sleeved on the lower end of the base 2. A first contact 6 and a second contact 7 are disposed on the bulb holder 10. A first light-emitting circuit and a second light-emitting circuit are disposed on the LED bulb panel 8. The metal ring 3 is electrically connected to a first end of the first light-emitting circuit and a first end of the second light-emitting circuit. The first contact 6 is electrically connected to a second end of the first light-emitting circuit. The second contact 7 is electrically connected to a second end of the second light-emitting circuit.

In the embodiment, compared with a conventional light bulb, the metal ring 3 is added in the present disclosure. That is, a third contact is additionally disposed. Therefore, two light-emitting circuits are disposed in the light bulb, and each of the light-emitting circuits emits light of one color, so that the light bulb emits light of two different colors.

In the embodiment, the first light-emitting circuit includes a first LED circuit or a plurality of first LED circuits connected in parallel with each other. Furthermore, the first LED circuit is formed by connecting a plurality of first LED lights in series. Furthermore, the plurality of first LED lights are white light LED lights. Furthermore, the first light-emitting circuit further includes a diode D1, and the diode D1 is connected to the first LED circuit.

In the embodiment, the second light-emitting circuit includes a second LED circuit or a plurality of second LED circuits connected in parallel with each other. Furthermore, the second LED circuit is formed by connecting a plurality of second LED lights in series. Furthermore, the plurality of second LED lights are yellow light LED lights. Furthermore, the second light-emitting circuit further includes a diode D2, and the diode D2 is connected to the second LED circuit.

In the embodiment, the lampshade 1 is selected from a plastic lampshade 1 and a glass lampshade 1. Furthermore, the plastic lampshade 1 is molding component made of PC material. In the embodiment, the bulb holder 10 is selected from an E27 bulb holder 10, a G125 bulb holder 10, and a G95 bulb holder 10. In the embodiment, a plurality of pins 5 are disposed on the metal ring 3, and a plurality of jacks 4 corresponding to the plurality of pins 5 are disposed on the base 2. Furthermore, the number of the plurality of pins 5 is four, and the four pins 5 are uniformly distributed on an inner side of the metal ring 3. The metal ring 3 is disposed on the base 2 by plugging the plurality of pins 5 into the plurality of jacks 4, which is very convenient for installation and removal.

In the embodiment, a plurality of bulb panel supporting components 11 are disposed on an inner wall of the base 2. The LED bulb panel 8 covers on the plurality of bulb panel supporting components 11. A plurality of LED lights 9 are disposed on the LED bulb panel 8. The plurality of LED lights 9 include white light LED lights and yellow light LED lights.

Compared with a conventional light bulb having only two contacts, the light bulb of the present disclosure has three contacts. Due to an addition of the third contact, there are the first LED lights and the second LED lights in the light bulb. The first LED lights emit white light and the second LED lights emit yellow light, and therefore, the light bulb has more functions than the second type of conventional light bulbs. There is no driver disposed in the light bulb of the present disclosure, so the cost is low and the service life is long. Further, the light bulb is used under low voltage, so the light bulb is more safety than the first type of the conventional light bulbs. The metal ring 3 of the present disclosure converts various types of bulb holders (E27, G125, G95, etc.) into three-contact LED bulbs.

The above embodiments are only optional embodiments of the present disclosure and are not limitations on the scope of the present disclosure. Without departing from the design spirit of the present disclosure, all kinds of deformations and improvements made according to the technical solutions of the present disclosure by those skilled in the art shall fall within the protection scope determined by the claims of the present disclosure.

What is claimed is:

1. A light bulb, comprising:

a bulb holder;

a base;

a lampshade; and an LED bulb panel;

wherein a lower end of the base is connected to the bulb holder; an upper end of the base is connected to the lampshade; the LED bulb panel is disposed on the base; a metal ring is sleeved on the lower end of the base; a first contact and a second contact are disposed on the bulb holder; a first light-emitting circuit and a second light-emitting circuit are disposed on the LED bulb panel; the metal ring is electrically connected to a first end of the first light-emitting circuit and a first end of the second light-emitting circuit; the first contact is electrically connected to a second end of the first light-emitting circuit, and the second contact is electrically connected to a second end of the second light-emitting circuit; the metal ring is electrically connected to the second contact and the first contact the first light-emitting circuit further comprises a first diode connected to the first contact the second light-emitting circuit further comprises a second diode connected to the second contact.

2. The light bulb according to claim 1, wherein the first light-emitting circuit comprises a first LED circuit or a plurality of first LED circuits connected in parallel with each other.

3. The light bulb according to claim 2, wherein the first LED circuit is formed by connecting a plurality of first LED lights in series.

4. The light bulb according to claim 3, wherein the plurality of first LED lights are white light LED lights.

5. The light bulb according to claim 1, wherein the second light-emitting circuit comprises a second LED circuit or a plurality of second LED circuits connected in parallel with each other.

6. The light bulb according to claim 5, wherein the second LED circuit is formed by connecting a plurality of second LED lights in series.

7. The light bulb according to claim 6, wherein the plurality of second LED lights are yellow light LED lights.

8. The light bulb according to claim 1, wherein the lampshade is molding component made of PC material.

9. The light bulb according to claim 1, wherein the bulb holder is selected from an E27 bulb holder, a G125 bulb holder, and a G95 bulb holder.

10. The light bulb according to claim 1, wherein a plurality of pins are disposed on the metal ring, and a plurality of jacks corresponding to the plurality of pins are defined on the base.

11. The light bulb according to claim 10, wherein the number of the plurality of pins is four, and the four pins are uniformly distributed on an inner side of the metal ring.

* * * * *